United States Patent [19]

Loveland

[11] Patent Number: 4,662,535
[45] Date of Patent: May 5, 1987

[54] CONTAINER AND METHOD FOR DISPOSING OF FLUORESCENT TUBES

[76] Inventor: James G. Loveland, 328 Lawn St., Geneva, Ohio 44041

[21] Appl. No.: 850,557

[22] Filed: Apr. 11, 1986

[51] Int. Cl.$^4$ ............................................. B65D 51/16
[52] U.S. Cl. .................................... 220/367; 206/443; 206/418; 206/419; 241/36; 241/99
[58] Field of Search ............... 220/367, 375; 206/443, 206/418, 419; 241/99, 36, 37.5

[56] References Cited

U.S. PATENT DOCUMENTS

| | | | |
|---|---|---|---|
| 2,638,022 | 5/1953 | Reyes | 241/99 |
| 3,623,672 | 11/1971 | DeFrank | 241/36 |
| 4,579,287 | 4/1986 | Brown | 241/36 |

FOREIGN PATENT DOCUMENTS 1098693  3/1955  France ................................. 220/69

Primary Examiner—George T. Hall
Attorney, Agent, or Firm—Pearne, Gordon, McCoy & Granger

[57] ABSTRACT

A method and apparatus are disclosed for conveniently and safely disposing of burnt out fluorescent light tubes. A disposal container is provided by a closely fitting, bendable tube which is permanently closed at one end and is provided with a removable closure cap at the other end. The fluorescent light tube to be disposed of is placed within the container and while confined in the container is broken and reduced to a relatively fine rubble having a small volume. Since the disposal container completely confines the tube when it is broken, the hazard of flying glass and powdered coating material is eliminated.

8 Claims, 6 Drawing Figures

U.S. Patent    May 5, 1987    4,662,535
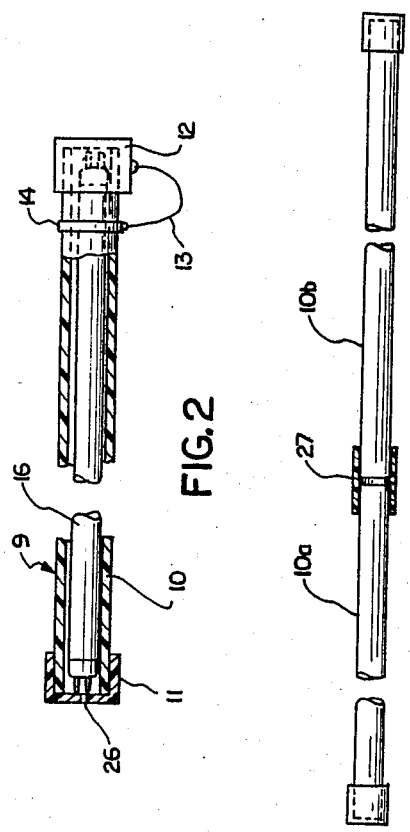
FIG.2
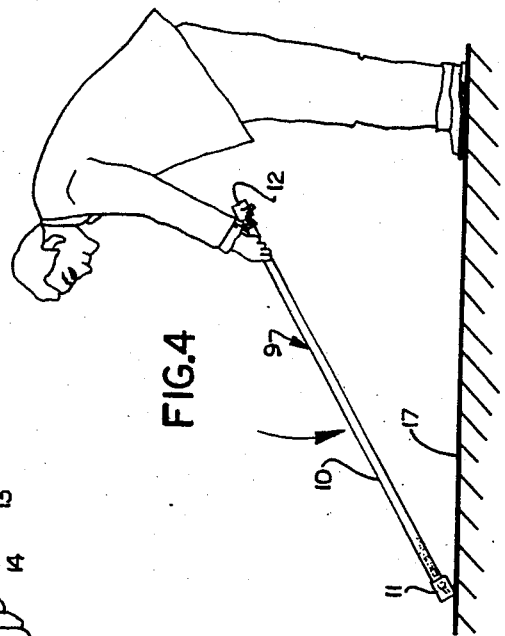
FIG.4
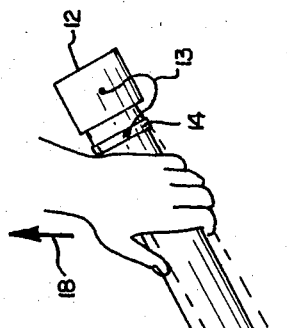
FIG.5
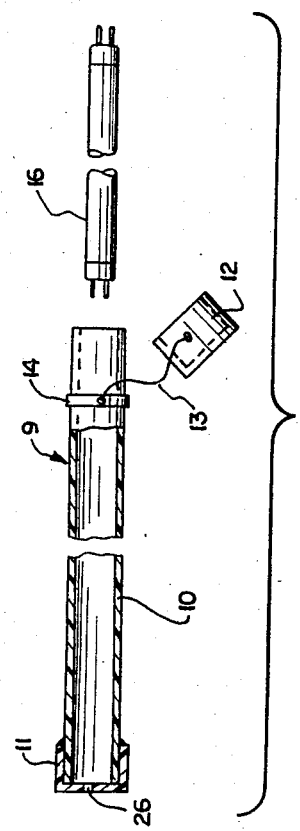
FIG.1
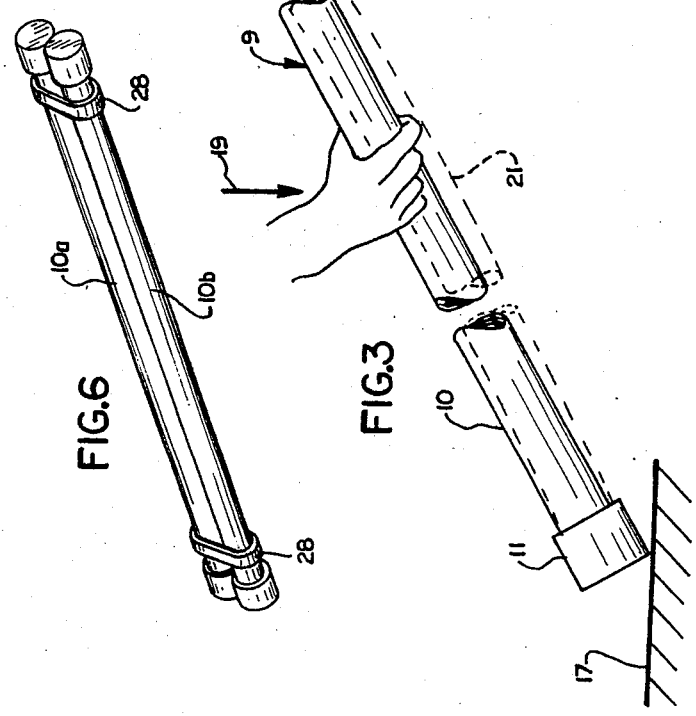
FIG.3
FIG.6

CONTAINER AND METHOD FOR DISPOSING OF FLUORESCENT TUBES

BACKGROUND OF THE INVENTION

This invention relates generally to fluorescent light tubes, and more particularly to a novel and improved method and apparatus for safely and conveniently disposing of used fluorescent light tubes.

PRIOR ART

Large numbers of fluorescent lights are often used in commercial buildings. Consequently, it is a common occurrence in such buildings to have to remove and replace burnt out light tubes. Further, particularly in commercial installations, the fluorescent light tubes are relatively large, usually four to eight feet along. Additionally, such tubes are fragile because they are long, thin glass tubes which are under vacuum. Therefore, unless they are handled with considerable care, they are likely to break, and when they break, the tube implodes, due to its internal vacuum, and there is a tendency for pieces of glass to fly around and create a hazard to anyone nearby. Further, if the tubes are broken accidentally, the scattered glass presents a cleanup problem. Still further, the inner surfaces of the tubes are coated with material which tends to powder and spread when the tube breaks, and such powder also presents a cleaning problem, and can also present a health hazard if it is inhaled into a person's lungs.

Generally in the past, fluorescent light tubes have been carried by the maintenance people from the location in which they are removed from the light fixture to a disposal location in which they are placed in trash containers or dumpsters. In some cases, the person discarding the light tube has purposely broken the tube in the trash container, and in other cases such light tubes are subsequently broken when additional trash is deposited in the trash container or when the trash container is subsequently handled or emptied. When they are purposely broken in the trash container, the flying glass can cause personal injury to the person breaking the tube. When the tubes are subsequently broken, they can also provide a hazard to the person placing additional trash in the container or subsequently handling the container.

Still further, the large size of the tubes and their fragile character require the maintenance personnel to handle a clumsy article in a careful manner to avoid accidental breakage of the tubes.

SUMMARY OF THE INVENTION

In accordance with the present invention, a novel and improved method and apparatus are provided which allow the maintenance personnel to safely break the tube immediately after it is removed from the light fixture and to reduce its volume to a small amount of trash which can be dumped into a container such as a pail, or even a paper bag, for easy and safe transport to the trash container in which it will be finally disposed of.

Therefore, the problem of carrying a large, fragile object to the trash container is eliminated and the danger involved from flying glass and flying coating material is completely eliminated.

In accordance with the preferred apparatus in accordance with this invention, a tubular disposal container is provided which is carried by the maintenance personnel to the location where the used, burnt out light tube is removed. Immediately upon removing the burnt out light tube, it is placed within the disposal container and, while confined by such container, is broken into small pieces which are then dumped out of the disposal tube into a suitable container in which they are carried to the ultimate trash disposal site.

Because the light tube is enclosed within the disposal tube when it is broken, the hazard of flying glass and powdered coating is eliminated. Also, because the bulk of the tube is greatly diminished, a large number of tubes can be easily carried to the trash location and deposited in the trash. In fact, the rubble resulting from the breakage of even a number of tubes can be easily carried in a relatively small paper bag.

In the particular illustrated embodiment, the disposal container is formed of polyvinyl chloride tubing, one and one-half inches in diameter. When intended for breaking four-foot tubes, the tubing is preferably about 47-¾ inches long, and when intended for breaking light tubes 8 feet long, the polyvinyl chloride tubing is preferably about 94-½ inches long.

A fixed cap is preferably installed on one end of the tube to permanently close such end, and a removable cap is removed to allow insertion of a light tube and emptying the debris after the light tube is broken. Preferably, such end cap is installed during the actual process of destroying the burnt out light tube.

It has been found that polyvinyl chloride tubing having a thickness of about 0.090 inch, which is commercially available, is suitable for use with this invention. Further, commercially available end caps are also suitable.

Because the light tubes are manufactured with an internal vacuum, the illustrated disposal container is provided with a vent to release the vacuum existing within the disposal tube after the light tube is broken. The vent can be provided by drilling a small vent hole, or by providing a loose fit in the removable cap.

The preferred method of breaking the tube within the container is as follows. After the light tube is installed in the disposal tube and the removable cap is placed over the end of the tube, one end of the tube is placed against the floor or some other fixed surface, and the tube is bent, causing bending and breakage of the tube within the disposal container. Because the light tube is completely enclosed within the disposal container, there is no hazard from flying glass or coating dust. After breaking the light tube in this manner, there may be a number of relatively large pieces of glass remaining. It is therefore preferred to hit one end of the disposal tube on the floor several times so as to shake or impact the pieces of the broken light tube against the walls of the container and against each other. It has been found that when this is done several times, the rubble resulting from the broken light tube consists of relatively small pieces of glass. Preferably, the striking of the disposal tube on a surface such as the floor should be carried out while the tube is at an angle with respect to the horizon of about 45 degrees or less. This reduces the tendency for the glass to dig into the side walls of the disposal tube. After the tube has been reduced to relatively fine rubble, the removable cap is removed and the tube is tipped up so that the rubble flows out of the open end into a suitable container, such as a paper bag or the like.

These and other aspects of the invention are illustrated in the accompanying drawings, and are more fully described in the following specification.

BRIEF DESCRIPTION OF THE DRAWINGS

FIG. 1 is a broken and exploded view, partially in section, of a disposal tube in accordance with a preferred embodiment of this invention and a used fluorescent light tube prior to its insertion into the disposal tube;

FIG. 2 is a broken section, illustrating the light tube within the disposal tube prior to the breaking of the light tube therein;

FIG. 3 illustrates the manner in which the light tube is preferably broken initially by bending the disposal tube, and in turn applying lateral forces to the light tube contained therein;

FIG. 4 illustrates the manner in which the end of the disposal tube is preferably hit on a hard surface such as the floor to cause impacting of the broken pieces of light tube contained therein and the further reduction in their size to a fine rubble condition;

FIG. 5 illustrates a modified structure of a disposal tube in accordance with this invention, in which two or more pieces of tubing are connected endwise to provide the required disposal tube length; and FIG. 6 illustrates an embodiment in which two similar disposal tubes can be assembled to permit disposal of two light tubes at the same time.

DETAILED DESCRIPTION OF THE DRAWINGS

One preferred embodiment of this invention is best illustrated in FIGS. 1 through 4. In such embodiment, the disposal container 9 is formed of a piece of tubing 10 of polyvinyl chloride. Such tubing is commercially available in various sizes, and is relatively inexpensive. It should be understood, however, that tubing formed of other similar suitable materials may be used to form the container.

The illustrated tube is about 1-½ inches in diameter and has a wall thickness of about 0.090 inch. When the container is intended for disposing of 8-foot fluorescent light tubes, the tube 10 is preferably about 94-½ inches long. When the container is intended for use in disposing of 4-foot fluorescent light tubes, the tube is preferably about 47-¾ inches long. In any event, the tube 10 should be sufficiently long to permit insertion of the entire fluorescent tube into the tube 10. An end cap 11, which is also commercially available for such tubing, is permanently mounted on one end of the tube 10 with a suitable adhesive. A removable end cap 12 of similar structure is provided to permit opening and closing of the other end of the tube 10. In order to keep the end cap 12 from being lost or misplaced, it is preferable to tether it on a short piece of cord 13, which is fastened to a collar 14 mounted on the adjacent end of the tube 10 with a suitable adhesive. Other forms of tethering structure may be utilized.

The 1-½ inch tube is sized to receive a used fluorescent light tube 16 with a relatively close fit. Insertion of the tube 16 into the container is easily accomplished by merely removing the removable end cap 12 and sliding the fluorescent light tube 16 into the tube until it engages the fixed end cap 11, as illustrated in FIG. 2. Once the light tube 16 is positioned within the container, as illustrated in FIG. 2, the removable end cap 12 is slipped into position to completely close the container. The cord 13 is long enough to allow easy installation and removal of the removable end cap 12.

While the fluorescent light tube is positioned within the container and substantially completely confined thereby, forces are applied causing the fluorescent tube to break. A preferred method of applying such force is illustrated in FIG. 3, in which the end cap 11 is placed against a floor surface 17 and the opposite end is positioned so that the disposal container is inclined upwardly from the floor. The opposite end of the tube substantially adjacent to the removable end cap 12 is then held up with one hand, as indicated by the arrow 18, while the user applies a downward force, indicated by the arrow 19, with his other hand, so as to bend the tube 10 to a position illustrated schematically by dotted lines 21. This causes a bending of the fluorescent tube 16 within the container, and causes the fluorescent tube to break.

Because the fluorescent tube is completely confined, it cannot shatter and pieces of glass cannot fly about in a hazardous manner. Usually, when the fluorescent tube is broken in this manner, relatively large pieces of glass remain. In order to further break the glass within the container, the user preferably taps the container against the floor 17 several times, as indicated in FIG. 4. This causes the pieces of glass within the container to be subjected to relatively sharp impacts which further break the glass into small pieces. This jarring action causes the glass to essentially disintegrate into small, fine pieces, which drop to the lower end of the tube. It has been found in actual practice that best results are obtained when the tube is held at an angle with respect to the horizon of less than 45 degrees. If, on the other hand, the container is held at too steep an angle, there is a tendency for the pieces of glass to dig into the sides of the tube 10, making it difficult to thereafter completely empty the tube.

When the material of the fluorescent light tube 16 is reduced to a relatively fine rubble or debris, the removable end cap 12 is removed and the tube is tipped up, causing the debris or rubble to pour into a suitable container such as a paper bag (not illustrated).

Because fluorescent tubes are generally under vacuum, it is preferable to provide venting means to allow air to flow into the container when the fluorescent tube is broken to relieve the vacuum. Such venting can be accomplished in one of several ways. One preferred method is to form a small vent opening 26 in one of the end caps (the end cap 11 in the illustrated embodiment). Other procedures include providing a small vent hole in the tube 10 itself, or providing a loose fit between the tube 10 and the removable end cap 12.

It should be understood that although it is preferred to provide an end cap at each end of the tube 12, the tendency for glass or coating materials to fly is substantially restricted even if a removable end cap 12 is not used and one end of the tube remains open. In such case, the vacuum within the tube tends to draw air in/when the light tube 16 is initially broken, and that tends to prevent pieces of glass or coating material from emerging from the open end of the tube. Further, gravity assists in retaining the material of the fluorescent tube 16 in the container so long as the container is maintained inclined downwardly toward the closed end.

Further, although it is preferred to cause the initial breakage of the fluorescent light tube by bending the container tube 10 in the manner illustrated, the initial breakage can be accomplished by the procedure illustrated in FIG. 4 of banging or sharply tapping the closed end of the tube against a floor surface.

With this invention, the person who is replacing burnt out, used fluorescent light tubes preferably takes the container with him along with the new replacement fluorescent light tubes. As soon as the burnt out light tube is removed from the lighting fixture, it is preferably placed in the disposal container and broken as discussed above, so that it can be safely disposed of and reduced to a very small volume which can be placed in a suitable pail or paper bag for subsequent disposal. Because the volume of the debris is quite small even from large fluorescent light tubes, a large number of burnt out fluorescent tubes can be easily carried in a relatively small paper bag or container. Further, since the fluorescent light tube is completely confined, there is no danger of the flying glass which is present in prior procedures used to dispose of such tubes.

FIG. 5 illustrates a second embodiment in which two separate tubes 10a and 10b are connected by a union or coupling 27. With such embodiment, two or more relatively short tubes are connected to provide the required length for even relatively long tubes such as 8-foot fluorescent light tubes. Such embodiment permits the disposal container to be shipped in a disassembled condition in relatively small packages, and then assembled by the user by connecting the ends of adjacent tubes with the coupling 27. Such coupling 27 can be permanently installed if the disposal container is intended for use with longer light tubes, such as 8-foot tubes. In such case, two 4-foot lengths of tubing 10a and 10b are connected for the disposal of longer fluorescent light tubes.

It is also within the broader aspects of this invention to utilize the coupling 27 to temporarily connect two shorter pieces of tubing 10a and 10b when disposing of long light tubes and to disconnect them when it is desired to dispose of shorter light tubes such as 4-foot light tubes. In that case, two tubes can be simultaneously disposed of, as illustrated in FIG. 6, wherein two pieces of tubing 10a and 10b are either separately used or are connected, for example, by rubber bands 28, so that the two tubes 10a and 10b can be utilized as a unit to simultaneously dispose of two separate fluorescent light tubes.

With this invention, a low-cost, easily used method and apparatus are provided for safely disposing of burnt out fluorescent light tubes, eliminating the hazard of flying glass and inhalation of coating dust and avoiding the necessity for cleaning up of debris when the tubes are accidentally shattered.

Although the preferred embodiments of this invention have been shown and described, it should be understood that various modifications and rearrangements of the parts may be resorted to without departing from the scope of the invention as disclosed and claimed herein.

What is claimed is:

1. A method of disposing of a fluorescent light tube comprising positioning said fluorescent tube in a closely fitting tubular container, causing said container to apply sufficient force to said fluorescent tube to cause the fluorescent light tube therein to break, and thereafter removing the pieces of fluorescent tube from said container, said force being applied by bending said container.

2. A method as set forth in claim 1, wherein before emptying said container said container is struck against a surface several times to reduce the size of pieces of fluorescent tube contained therein.

3. A method of disposing of a fluorescent light tube comprising placing said tube in an elongated container having a wall surface in close proximity to said fluorescent tube, bending the wall of the container against said fluorescent tube causing said fluorescent tube to break while it is confined in said container, and thereafter shaking the pieces of said fluorescent tube within said container to reduce the size of said pieces, and thereafter removing said pieces from said container.

4. A disposal container for a fluorescent light tube comprising a container tube closed at at least one end and having a length permitting a fluorescent tube to be totally enclosed therein, said container tube being sufficiently light to allow it to be easily carried and sufficiently strong to allow it to be struck against a solid object without damage to said container tube, and a removable cap to close the other end of said container tube while a fluorescent tube is broken therein, said container providing vent means through which air can flow into said container to reduce the vacuum therein created when a fluorescent light tube is broken in said container.

5. A disposal container as set forth in claim 4, wherein flexible connecting means are provided between said container tube and said removable cap to prevent the loss of said removable cap.

6. A disposal container for a fluorescent light tube comprising a container tube closed at at least one end and having a length permitting a fluorescent tube to be totally enclosed therein, said container tube being sufficiently light to allow it to be easily carried and sufficiently strong to allow it to be struck against a solid object without damage to said container tube, said container tube including two tube sections joined at adjacent ends by a coupling.

7. A disposal container for fluorescent light tubes comprising container tubes closed at at least one end and having a length permitting a fluorescent tube to be totally enclosed therein, said container tubes being sufficiently light to allow them to be easily carried and sufficiently strong to allow them to be struck against a solid object without damage to said container tube, two separate container tubes being connected together in parallel permitting simultaneous disposal of two fluorescent tubes.

8. A disposal container as set forth in claim 4, wherein said container tube is formed of polyvinyl chloride tubing having a diameter of about one and one-half inches and a wall thickness of about 0.090 inch.

* * * * *